(12) United States Patent
Liao et al.

(10) Patent No.: US 11,767,121 B2
(45) Date of Patent: Sep. 26, 2023

(54) OPTIMIZED ENVIRONMENTAL CONTROL SYSTEM FOR MILITARY AIRCRAFT

(71) Applicant: Hamilton Sundstrand Corporation, Charlotte, NC (US)

(72) Inventors: Xiaohong Liao, Andover, CT (US); Louis J. Bruno, Ellington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 736 days.

(21) Appl. No.: 16/785,051

(22) Filed: Feb. 7, 2020

(65) Prior Publication Data

US 2021/0245888 A1 Aug. 12, 2021

(51) Int. Cl.
*B64D 13/08* (2006.01)
*B64D 13/06* (2006.01)

(52) U.S. Cl.
CPC ............ *B64D 13/08* (2013.01); *B64D 13/06* (2013.01); *B64D 2013/0648* (2013.01); *B64D 2013/0662* (2013.01)

(58) Field of Classification Search
CPC ......................... B64D 13/06; B64D 2013/0603
USPC ................................................ 454/71, 72, 76
See application file for complete search history.

(56) References Cited

U.S. PATENT DOCUMENTS

| | | | |
|---|---|---|---|
| 4,967,565 A | 11/1990 | Thomson et al. | |
| 5,121,610 A | 6/1992 | Atkinson et al. | |
| 5,343,692 A | 9/1994 | Thomson et al. | |
| 5,461,882 A | 10/1995 | Zywiak | |
| 6,148,622 A | 11/2000 | Sanger | |
| 6,250,097 B1 | 6/2001 | Lui et al. | |
| 6,457,318 B1 | 10/2002 | Lui et al. | |
| 6,519,969 B2 | 2/2003 | Sauterleute | |
| 6,595,010 B2 | 7/2003 | Sauterleute et al. | |
| 6,981,388 B2 | 1/2006 | Brutscher et al. | |
| 2004/0195447 A1 | 10/2004 | Claeys | |
| 2006/0162371 A1* | 7/2006 | Lui .................. | B64D 13/06 62/402 |

(Continued)

FOREIGN PATENT DOCUMENTS

EP 1327582 A1 7/2003
EP 3862273 A1 8/2021

OTHER PUBLICATIONS

European Search Report; European Application No. 21155815.0; dated Jun. 25, 2021; 9 pages.

(Continued)

*Primary Examiner* — Ko-Wei Lin
(74) *Attorney, Agent, or Firm* — CANTOR COLBURN LLP

(57) ABSTRACT

An environmental control system (ECS) of an aircraft includes an inlet for a first medium, an outlet for the first medium, an air cycle machine including a compressor, a turbine, and a shaft operably coupling the compressor and the turbine, and a plurality of heat exchangers arranged in fluid communication with the air cycle machine. A first heat exchanger of the plurality of heat exchangers is arranged directly downstream from the turbine and heat is transferred to the first medium within the first heat exchanger. A water extractor is arranged directly downstream from the first heat exchanger and a flow path connects the air cycle machine, the plurality of heat exchangers, and the water extractor with the inlet and the outlet.

15 Claims, 1 Drawing Sheet

(56) References Cited

U.S. PATENT DOCUMENTS

2016/0347456 A1* 12/2016 Bruno .................. F02C 6/08
2017/0341768 A1* 11/2017 Bruno .................. B64D 13/06
2019/0015844 A1*  1/2019 Monacchio ........... A47L 9/0411
2019/0112052 A1   4/2019 Bruno et al.
2019/0135441 A1*  5/2019 Bruno .................. B64D 13/06

OTHER PUBLICATIONS

European Office Action for European Application No. 21 155 815.0; Report Mail dated Nov. 23, 2022 (pp. 1-8).

* cited by examiner

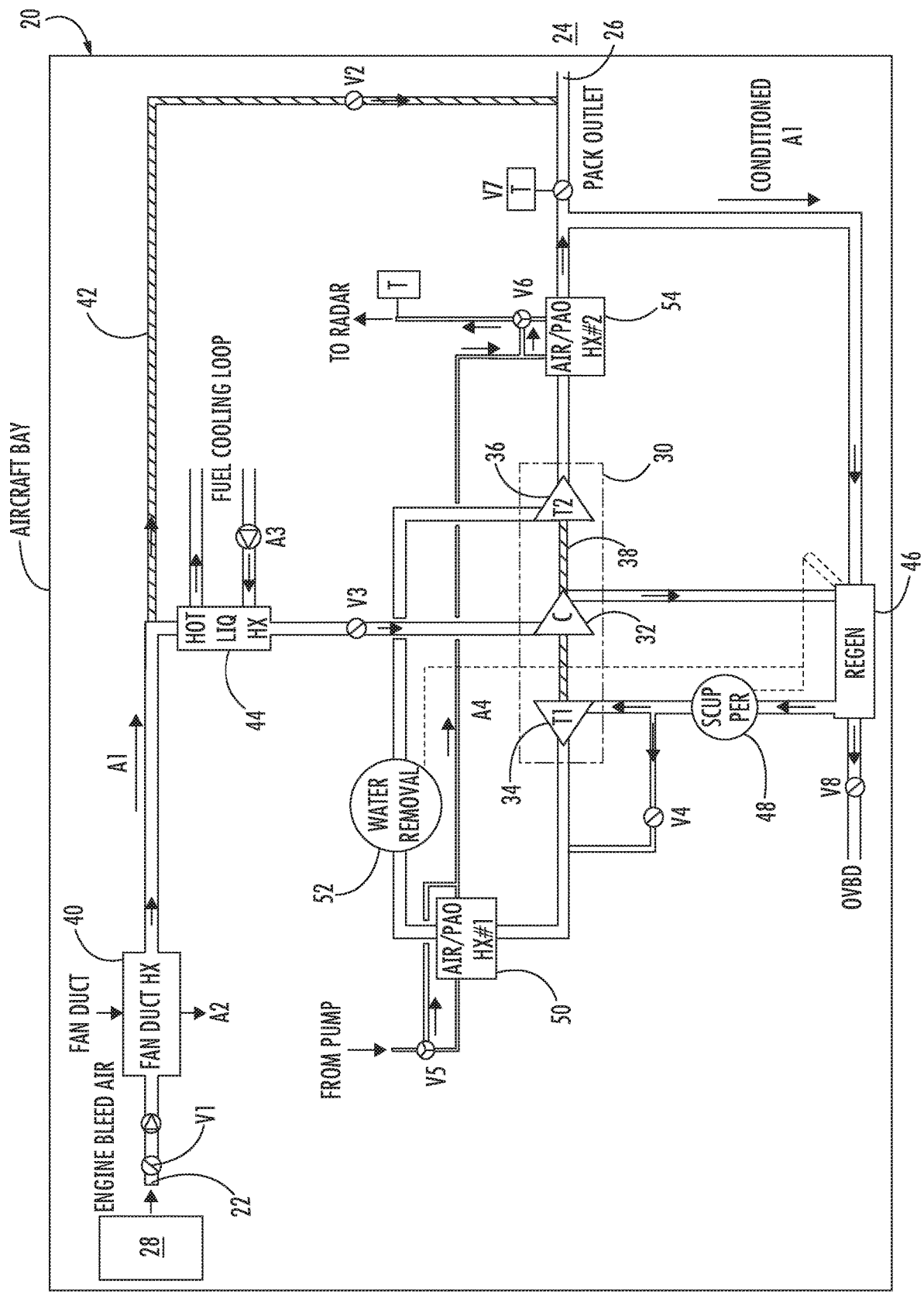

OPTIMIZED ENVIRONMENTAL CONTROL SYSTEM FOR MILITARY AIRCRAFT

BACKGROUND

The present disclosure relates generally to an environmental control system of an aircraft, and more particularly, to an environmental control system of a military aircraft.

Aircraft typically employ an Environmental Control System ("ECS"), to cool, filter, pressurize and otherwise condition one or more loads or areas of the aircraft, such as an aircraft cabin or a cockpit. An ECS typically operates on a flow of bleed air taken from an intermediate or high pressure stage within a jet engine having multiple compression stages or from an Auxiliary Power Unit ("APU"), which is a separate turbine engine that is not used for propulsion, to power the ECS. Since compressed ambient air or engine bleed air is readily available, it is a convenient source of power for an ECS. In most systems the engine bleed air is passed through a heat exchanger which is cooled by a ram air or fan driven arrangement, thereby lowering the engine bleed air temperature. To further lower the temperature and pressure of the engine bleed air, the engine bleed air also can be expanded in a refrigeration turbine. In a typical system, the turbine also drives the ram air fan. From the turbine, the cooled cool or cold air is routed through the aircraft for various uses (e.g., cockpit cooling and pressurization, forced air avionics cooling, etc.). After this air has been used, it is generally not reclaimed for any other use and it is discharged overboard.

It is desirable to increase the cooling capacity of an ECS in, for example, the existing designs of performance sensitive aircraft such as a military fighter aircraft. Increasing cooling capacity, however, typically requires an increase in the size of the ECS. A larger ECS also usually requires significant changes to bleed air routing, such as large ducts, and structural changes as well as additional ram air. Accordingly, an ECS and the associated support structures typically would need to grow beyond their current volumes to further increase the cooling capacity of an ECS. There is therefore a need to increase the cooling capacity of an ECS of an aircraft without increasing the aircraft volume occupied by the ECS.

BRIEF DESCRIPTION

According to one embodiment, an environmental control system (ECS) of an aircraft includes an inlet for a first medium, an outlet for the first medium, an air cycle machine including a compressor, a turbine, and a shaft operably coupling the compressor and the turbine, and a plurality of heat exchangers arranged in fluid communication with the air cycle machine. A first heat exchanger of the plurality of heat exchangers is arranged directly downstream from the turbine and heat is transferred to the first medium within the first heat exchanger. A water extractor is arranged directly downstream from the first heat exchanger and a flow path connects the air cycle machine, the plurality of heat exchangers, and the water extractor with the inlet and the outlet.

In addition to one or more of the features described above, or as an alternative, in further embodiments a second medium is configured to transfer heat to the first medium within the first heat exchanger, the second medium being provided from a first onboard system separate from the ECS.

In addition to one or more of the features described above, or as an alternative, in further embodiments the first onboard system is an avionics cooling system and the second medium is an avionics cooling fluid.

In addition to one or more of the features described above, or as an alternative, in further embodiments the air cycle machine includes another turbine operably coupled to the compressor by the shaft, the first heat exchanger and the water extractor being arranged downstream from the turbine and upstream from the another turbine.

In addition to one or more of the features described above, or as an alternative, in further embodiments the plurality of heat exchangers includes a second heat exchanger arranged downstream from the another turbine and heat is transferred to the first medium within the second heat exchanger.

In addition to one or more of the features described above, or as an alternative, in further embodiments the second heat exchanger is arranged downstream from and in fluid communication with the first heat exchanger relative to a flow of the second medium.

In addition to one or more of the features described above, or as an alternative, in further embodiments the plurality of heat exchangers includes five heat exchangers.

In addition to one or more of the features described above, or as an alternative, in further embodiments the plurality of heat exchangers includes a second heat exchanger and a third medium is arranged in a heat transfer relationship with the first medium at the second heat exchanger, the third medium being provided from a second onboard system separate from the ECS.

In addition to one or more of the features described above, or as an alternative, in further embodiments the second onboard system is an engine and the third medium is a fluid output from a fan duct of the engine.

In addition to one or more of the features described above, or as an alternative, in further embodiments the plurality of heat exchangers includes a third heat exchanger and a fourth medium is arranged in a heat transfer relationship with the first medium at the third heat exchanger, the fourth medium being provided from a third onboard system separate from the ECS.

In addition to one or more of the features described above, or as an alternative, in further embodiments the third onboard system is a fuel cooling system and the fourth medium is fuel.

In addition to one or more of the features described above, or as an alternative, in further embodiments the plurality of heat exchangers includes a fourth heat exchanger, the fourth heat exchanger being arranged downstream from the compressor and upstream from the at least one turbine along the flow path of the first medium.

In addition to one or more of the features described above, or as an alternative, in further embodiments the first medium is cooled within the fourth heat exchanger by conditioned first medium provided directly upstream from the outlet.

In addition to one or more of the features described above, or as an alternative, in further embodiments the conditioned first medium output from the fourth heat exchanger is exhausted overboard.

In addition to one or more of the features described above, or as an alternative, in further embodiments none of the plurality of heat exchangers is configured to receive a flow of ram air.

According to another embodiment, a method of operating an environmental control system (ECS) of an aircraft includes supplying a first medium to an inlet of the ECS, supplying at least a portion of the first medium to a turbine of an air cycle machine, supplying the first medium to a heat exchanger arranged directly downstream from the turbine, and controlling a temperature of the first medium output from the heat exchanger to actively control a humidity level of the conditioned first medium provided to an outlet of the ECS.

In addition to one or more of the features described above, or as an alternative, in further embodiments controlling the temperature of the first medium output from the heat exchanger includes controlling an amount of heat added to the first medium at the heat exchanger from a second medium.

In addition to one or more of the features described above, or as an alternative, in further embodiments controlling the amount of heat added to the first medium at the heat exchanger includes controlling the temperature of the first medium provided to the heat exchanger.

In addition to one or more of the features described above, or as an alternative, in further embodiments the controlling the temperature of the first medium provided to the heat exchanger includes modulating a valve to allow at least a portion of the first medium provided to the heat exchanger to bypass the turbine.

In addition to one or more of the features described above, or as an alternative, in further embodiments comprising collecting and removing free moisture from the first medium within a water extractor arranged downstream from the heat exchanger.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 1 is a schematic diagram of a portion of an environmental control system of a performance sensitive aircraft according to an embodiment.

DETAILED DESCRIPTION

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Embodiments herein provide an environmental control system of an aircraft that uses mediums from different sources to power the environmental control system and to provide cabin pressurization and cooling at high fuel burning efficiency. The mediums described herein are generally types of air; however, it should be understood that other media, such as other gases, liquids, fluidized solids, or slurries are also contemplated herein.

With reference now to FIG. 1 an example of an environment control system (ECS) 20 according to a non-limiting embodiment is depicted. Although the ECS 20 (also referred to herein as "the system") is described with reference to an aircraft, such as a performance sensitive military fighter aircraft for example, alternative applications related to another type of vehicle, such as any fixed wing or rotary wing aircraft, are also within the scope of the disclosure.

As shown in FIG. 1, the system 20 is configured to receive a first medium A1 at an inlet 22 including a pressure regulator V1 and provide a conditioned form of the first medium A1 to a volume 24 after, such as a cabin or cockpit of the aircraft for example, via an outlet 26. In embodiments where the environmental control system 20 is used in an aircraft application, the first medium A1 can include bleed air, which is pressurized air originating from an engine or auxiliary power unit of the aircraft, illustrated schematically at 28. Note that one or more of the temperature, humidity, and pressure of the bleed air can vary based upon a compressor stage and revolutions per minute of the engine.

The flow path of the first medium extending between the inlet 22 and the outlet 26 additionally includes at least one air cycle machine 30. In the illustrated, non-limiting embodiment, the system 20 includes a single air cycle machine 30. However, embodiments including a plurality of air cycle machines, such as two air cycle machines arranged in parallel or series for example, are also contemplated herein.

The air cycle machine 30 is a mechanical device that includes components for performing thermodynamic work on a medium (e.g., extracts work from or applies work to the first medium A1 by raising and/or lowering pressure and by raising and/or lowering temperature).

In the illustrated, non-limiting embodiment, the air cycle machine 30 includes a three-wheel air cycle machine including a compressor 32, a first turbine 34, and a second turbine 36 operably coupled via a shaft 38. However, it should be understood that any suitable air cycle machine 30 having any number of wheels (i.e. two-wheel or four-wheel for example) are also within the scope of the disclosure. The compressor 32 is a mechanical device that raises a pressure of a medium provided thereto. The compressor 32 may be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 32 is configured to receive and pressurize the medium provided thereto.

The first and second turbines 34, 36 are mechanical devices that expand and extract work from a medium (also referred to as extracting energy). In the air cycle machine 30, the turbines 34, 36 drive rotation of the compressor 32 via the shaft 38. In a non-limiting embodiment, the first turbine 34 and/or the second turbine 36 can include a nozzle (not shown) configured to accelerate the medium provided thereto for entry into a turbine impeller (not shown).

In addition to the air cycle machine 30, the system 20 includes several other elements, such as a plurality of heat exchangers for example, to be described in more detail below. Although the system 20 is illustrated and described as including five distinct heat exchangers, it should be understood that embodiments having any number of heat exchangers, such as fewer than five heat exchangers, or alternatively, more than five heat exchangers are also contemplated herein.

As shown, the elements of the system 20 are generally connected via valves, tubes, pipes, conduits, and the like. The valves disclosed herein are used to regulate, direct, and/or control a flow of a medium by opening, closing, or partially obstructing various passageways within the tubes, pipes, conduits etc. of the system. Valves can be operated by actuators, such that flow rates of the medium in any portion of the system can be regulated to a desired value. For instance, the system 20 may include a first valve V operable to control a flow of the first medium A1 provided to the system 20. A second valve V2 may be used to control whether a portion of the flow of the first medium output from a first heat exchanger bypasses the remaining components of the system 20. Similarly, V3 may be used to control a flow of the first medium provided to the air cycle machine 30. A fourth valve V4 is operable to allow a portion of the first medium to bypass the first turbine 34 of the air cycle machine 30, and a fifth and sixth valve V5, V6 are operable to allow a secondary flow to bypass one or more heat exchangers associated with the secondary flow. Additionally, a seventh valve V7 may be operable to direct at least a portion of a flow of conditioned first medium A1 directly upstream from the outlet 26 of the system 20 to one of the heat exchangers of the system 20. For capacity control, a valve V8 is configured to control a flow of fluid to be exhausted from the ECS 20 overboard. In an embodiment, valves V7 and V8 should be designed such that when one valve is fully open, a flow through the other valve is modulated.

In an embodiment, the system 20 uses several mediums provided from other systems onboard the aircraft to condition the medium provided thereto. An existing ECS typically includes one or more heat exchangers that use ram air to cool and condition the medium air. However, the system of FIG. 1 does not use ram or ambient air to cool the first medium. As shown, the flow of first medium A1 provided to the ECS 20 from a bleed air source 28 is cooled within a first heat exchanger 40 by a second medium A2. In an embodiment, the flow of second medium is provided from a first onboard system (not shown) separate from the ECS 20. For example, the second medium A2 may include air or engine exhaust output from a portion of one or more engines of the aircraft, such as from a fan duct of the engine for example. The temperature of the second medium A2 provided to the first heat exchanger 40 is generally less than the temperature of the first medium A1. As a result, the temperature of the first medium A1 is cooled within the first heat exchanger 40.

The high temperatures of engine exhaust output from a fan duct of an engine have typically precluded the use of engine exhaust to cool a flow of medium in existing environmental control systems. In addition, the engine may be located a substantial distance from the ECS. As a result, in previous aircraft, the limited amount of cooling provided by the engine exhaust did not outweigh the additional complexity required to route the engine exhaust to the ECS.

In an embodiment, an outlet of the first heat exchanger 40 is arranged in fluid communication with a conduit 42 including a bypass valve V2. The outlet of the conduit 42 is arranged directly upstream from the outlet 26. When the bypass valve V2 is open, at least a portion of the first medium A1 output from the first heat exchanger 40 is configured to bypass the remaining components of the ECS 20 via the conduit 42. By allowing at least a portion of the flow to bypass the remaining components, the temperature of the conditioned air provided at the outlet 26 may be increased. Accordingly, the valve V2 may be open when the conditioned air to be provided to one or more loads, such as the cockpit for example, is less than 35° F.

The outlet of the first heat exchanger 40 is additionally arranged in fluid communication with a second heat exchanger 44. Within the second heat exchanger 44, the flow of first medium A1 is cooled by a third medium A3. The third medium A3 is also provided to the ECS 20 from an onboard system distinct from the ECS 20. The onboard system configured to deliver the third medium A3 may be a different system, or alternatively, may be the same onboard system as used to deliver the second medium A2. In the illustrated, non-limiting embodiment, the third medium A3 is fuel arranged within a fuel cooling system. The temperature of the third medium A3 provided to the second heat exchanger 44 is less than the temperature of the first medium therein. As a result, the first medium A1 is further cooled within the second heat exchanger 44.

The outlet of the second heat exchanger 44 is fluidly connected to an inlet of the compressor 32 of the air cycle machine 30. The compressed first medium A1 output from the compressor 32 has an increased temperature and pressure relative to the first medium A1 provided to the inlet of the compressor 32. As will be described in more detail below, work extracted by a turbine 34, 36 of the air cycle machine 30 is used by the compressor 32 used to compress the first medium A1.

A third, regenerative heat exchanger 46 is arranged downstream from the outlet of the compressor 32 relative to the flow of the first medium A1. In the illustrated, non-limiting embodiment, the third heat exchanger 46 is also configured to receive a flow of the conditioned first medium A1 from directly upstream of outlet of the ECS 20. This conditioned flow of the first medium A1 is used to cool the first medium A1 output from the compressor 32 before being exhausted or dumped overboard to the ambient atmosphere. Accordingly, the regenerative heat exchanger functions similar to a condenser. The resulting cooled first medium A1 output from the third heat exchanger 46 is provided to a scupper 48 where any free moisture within the pressurized first medium A1 is removed to produce a dried, pressurized first medium A1. Although a scupper 48 is illustrated in the FIG. 1, in other embodiments, another suitable water collector or water extraction device may be used.

From the scupper 48, the dried first medium A1 is provided to the first turbine 34 of the air cycle machine 30. Within the first turbine 34, the first medium A1 is expanded and work is extracted therefrom. As a result, the temperature and the pressure of the first medium A1 output from the first turbine 34 is less than that of the first medium A1 provided to the inlet of the first turbine 34. The energy that is extracted from the first medium A1 via the first turbine 34 is used to at least partially power the compressor 32 to compress the first medium A1 therein. For example, rotation of the turbine impeller (not shown) in response to the pressurized first medium A1 drives rotation of an impeller (not shown) of the compressor 32 operably coupled thereto via the shaft 38.

In embodiments where valve V4 is open, all or a portion of the first medium A1 output from the scupper 48 is configured to bypass the first turbine 34. By allowing a portion of the first medium A1 to bypass the first turbine 34, a temperature of the first medium A1 provided to a downstream heat exchanger 50, to be described in more detail below, may be increased to prevent icing of the heat exchanger 50.

Another heat exchanger 50 is arranged downstream from the scupper 48 and the first turbine 34. Within this fourth heat exchanger 50, the first medium A1 is warmed through a heat exchange relationship with a warmer fourth medium A4 provided from yet another onboard system, separate from the ECS 20. In the illustrated, non-limiting embodiment, this fourth heat exchanger 50 is arranged in fluid communication with an avionics cooling system of the aircraft. In such embodiments, the fourth medium A4 provided to the heat exchanger 50 may be an avionics cooling fluid, such as synthetic lubricant such as polyalphaolefin ("PAO") for example. Within the aircraft, the fourth medium A4 is typically used to remove heat from various electrical loads connected to the avionics cooling loop. As a result, the first medium A1 is warmed through a heat exchange relationship with the heated fourth medium A4 of the avionics loop. However, it should be understood that the medium used to increase the temperature of the first medium A1 at the fourth heat exchanger may be provided from another onboard system of the aircraft, including an onboard system associated with one or more of the upstream heat exchangers of the ECS 20.

Located directly downstream from the fourth heat exchanger is another water removal device 52. From the fourth heat exchanger 50, the warmed first medium A1 flows through the water removal device 52 where free moisture is removed to produce a warmed, dried first medium.

In an embodiment, the temperature of the first medium A1 provided to the fourth heat exchanger 50 is controlled to manage the liquid load of the fourth heat exchanger 50, and therefore the temperature of the first medium A1 output from the fourth heat exchanger 50. This control is performed by selectively opening valve V4 to allow all or a portion of the first medium A1 output from the third heat exchanger 46 to bypass the turbine. This management of the liquid load within the fourth heat exchanger 50 may be used to achieve a desired level or moisture removal at the water extractor 52 to meet the requirements of the one or more loads of the aircraft. Accordingly, the temperature of the first medium A1 supplied to an output from the fourth heat exchanger 50 can be used to actively control the humidity level of the conditioned first medium provided to the outlet 26 of the ECS 20.

The first medium A1 is then provided to the second turbine 36 of the air cycle machine 30, where the first medium A1 is expanded and work is extracted therefrom. The supplemental energy extracted from first medium A1 within the second turbine 34 may be used to increase an amount of the first medium A1 compressed within the compressor 32. As shown, the cooled first medium A1 output from the second turbine 36 may be provided to yet another downstream heat exchanger 54, where the first medium A1 is warmed through a heat exchange relationship with a medium provided from an onboard system distinct from the ECS. In the illustrated, non-limiting embodiment, this fifth heat exchanger 54 is also arranged in fluid communication with the avionics cooling loop, such as at a location downstream from the fourth heat exchanger 50 for example. In such embodiments, the fourth medium A4 is provided to both the fourth and fifth heat exchangers 50, 54 sequentially. However, embodiments where a fifth medium from a system separate from the avionics cooling loop is provided to the fifth heat exchanger 54 are also contemplated herein. Within the fifth heat exchanger 54, heat from the fourth medium A4 is transferred to the first medium A1. As a result, the first medium A1 output from the fifth heat exchanger 54 has a desired temperature and/or pressure suitable to meet the demands of one or more loads.

In an embodiment, the fifth valve V5 or the sixth valve V6 formed as part of the avionics cooling loop are operable to cause a portion of the fourth medium A4 within the avionics cooling loop to bypass the fourth heat exchanger 50 and the fifth heat exchanger 54, respectively. By allowing the fourth medium A4 to bypass the fourth heat exchanger 50, free moisture within the first medium A1 downstream of the heat exchanger 50 can accumulate. As a result, the total amount of free moisture that is removed from the first medium A1 within the water removal device 52 may be increased.

At the outlet of the fifth heat exchanger 54, the first medium A1 may be considered "conditioned". As used herein the term "conditioned" is intended to suggest that a temperature and pressure of the first medium A1 is sufficient to meet the demands associated with the one or more loads or areas arranged in fluid communication with the outlet 26 of the ECS 20. In embodiments where the seventh valve V7 is closed, and therefore no conditioned first medium A1 is provided at the outlet 26 of the system, all of the conditioned first medium A1 is directed to the third heat exchanger 46, where it is used to cool or lower the temperature of the first medium A1 output from the compressor 32.

The ECS 20 illustrated and described herein has a reduced number of components and therefore occupies less space within the aircraft than required by a conventional ECS system for the same aircraft. For example, the ECS 20 may occupy less than 80% of the aircraft bay, whereas a conventional ECS system would typically occupy the entire 100% of the aircraft bay for the same aircraft. In addition, the cooling capacity of this new ECS 20 is equal to or substantially increased compared to a conventional ECS system for the same aircraft. In an embodiment, the cooling capacity of the ECS 20 is more than double the existing cooling capacity of about 30 kW. For example, the cooling capacity of the ECS 20 illustrated and described herein is greater than 60 kW, greater than 70 kW, and greater than 75 kW, such as 80 kW for example.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. An environmental control system (ECS) of an aircraft, the ECS comprising:
    an inlet for a first medium;
    an outlet for the first medium;
    an air cycle machine including a compressor, a turbine, and a shaft operably coupling the compressor and the turbine;
    a plurality of heat exchangers arranged in fluid communication with the air cycle machine, wherein a first heat exchanger of the plurality of heat exchangers is arranged directly downstream from the turbine and heat is transferred to the first medium within the first heat exchanger;
    a water extractor arranged directly downstream from the first heat exchanger; and
    a flow path connecting the air cycle machine, the plurality of heat exchangers, and the water extractor with the inlet and the outlet.

2. The ECS of claim 1, wherein a second medium is configured to transfer heat to the first medium within the first heat exchanger, the second medium being provided from a first onboard system separate from the ECS.

3. The ECS of claim 2, wherein the first onboard system is an avionics cooling system and the second medium is an avionics cooling fluid.

4. The ECS of claim 2, wherein the air cycle machine includes another turbine operably coupled to the compressor by the shaft, the first heat exchanger and the water extractor being arranged downstream from the turbine and upstream from the another turbine.

5. The ECS of claim 4, wherein the plurality of heat exchangers includes a second heat exchanger arranged downstream from the another turbine and heat is transferred to the first medium within the second heat exchanger.

6. The ECS of claim 5, wherein the second heat exchanger is arranged downstream from and in fluid communication with the first heat exchanger in a flow direction of the second medium.

7. The ECS of claim 1, wherein the plurality of heat exchangers includes five heat exchangers.

8. The ECS of claim 1, wherein the plurality of heat exchangers includes a second heat exchanger and a third medium is arranged in a heat transfer relationship with the first medium at the second heat exchanger, the third medium being provided from a second onboard system separate from the ECS.

9. The ECS of claim 8, wherein the second onboard system is an engine and the third medium is a fluid output from a fan duct of the engine.

10. The ECS of claim 8, wherein the plurality of heat exchangers includes a third heat exchanger and a fourth medium is arranged in a heat transfer relationship with the first medium at the third heat exchanger, the fourth medium being provided from a third onboard system separate from the ECS.

11. The ECS of claim 10, wherein the third onboard system is a fuel cooling system and the fourth medium is fuel.

12. The ECS of claim 10, wherein the plurality of heat exchangers includes a fourth heat exchanger, the fourth heat exchanger being arranged downstream from the compressor and upstream from the turbine along the flow path of the first medium.

13. The ECS of claim 12, wherein the first medium is cooled within the fourth heat exchanger by conditioned first medium provided directly upstream from the outlet.

14. The ECS of claim 12, wherein the conditioned first medium output from the fourth heat exchanger is exhausted overboard.

15. The ECS of claim 1, wherein none of the plurality of heat exchangers is configured to receive a flow of ram air.

* * * * *